(12) United States Patent
Palmer et al.

(10) Patent No.: US 7,193,335 B2
(45) Date of Patent: Mar. 20, 2007

(54) SENSING SOCKET ASSEMBLY

(75) Inventors: Norman Palmer, Glenfield (GB); Peter Steven Robertson, Toton (GB); Ian Browne, East Hamilton (GB)

(73) Assignee: One Click (IP) Limited, Nottingham (GB)

(\*) Notice: Subject to any disclaimer, the term of this patent is extended or adjusted under 35 U.S.C. 154(b) by 0 days.

(21) Appl. No.: 10/497,851

(22) PCT Filed: Nov. 11, 2002

(86) PCT No.: PCT/GB02/05093

§ 371 (c)(1),
(2), (4) Date: Feb. 28, 2005

(87) PCT Pub. No.: WO03/048911

PCT Pub. Date: Jun. 12, 2003

(65) Prior Publication Data

US 2006/0175903 A1     Aug. 10, 2006

(30) Foreign Application Priority Data

Dec. 7, 2001   (GB) .................. 0129331.5

(51) Int. Cl.
  *H02J 1/00*   (2006.01)
  *H02J 3/00*   (2006.01)
  *H02J 3/14*   (2006.01)

(52) U.S. Cl. .......................... 307/39; 307/35
(58) Field of Classification Search ................. 307/39, 307/35

See application file for complete search history.

(56) References Cited

U.S. PATENT DOCUMENTS

| 4,675,537 A | 6/1987 | Mione |
| 5,465,366 A | 11/1995 | Heineman .................. 395/750 |
| 5,563,455 A * | 10/1996 | Cheng .......................... 307/41 |
| 6,891,478 B2 * | 5/2005 | Gardner ...................... 340/635 |

FOREIGN PATENT DOCUMENTS

| DE | 4135493 | 2/1993 |
| DE | 29705670 | 6/1997 |
| DE | 19816560 | 10/1999 |
| EP | 0376495 | 7/1990 |
| EP | 0676688 | 10/1995 |
| FR | 2728074 | 6/1996 |
| FR | 2788891 | 7/2000 |
| GB | 2327819 | 2/1999 |
| GB | 0129331.5 | 12/2001 |
| WO | WO 03048911 | 6/2003 |

\* cited by examiner

*Primary Examiner*—Brian Sircus
*Assistant Examiner*—Carlos Amaya
(74) *Attorney, Agent, or Firm*—Ryan Kromholz & Manion, S.C.

(57) ABSTRACT

A socket assembly enables a number of electrical appliances to be automatically isolated from, and reconnected to, an electrical power supply upon respectively switching off or on a "master" appliance. Generally, the assembly includes: a master electrical outlet and at least one slave electrical outlet, both connectable to a common power source; sensing means for sensing power drawn from the master electrical outlet; a controller operable to isolate the at least one slave electrical outlet from the power source when the sensing means detects a fall in power drawn from the master electrical outlet from a first, higher level to a second, lower level.

28 Claims, 3 Drawing Sheets

SDOC MASTER-SLAVE CONTROLLER
VERSION 2 WITH RELAY

SDOC MASTER-SLAVE CONTROLLER
VERSION 2 WITH RELAY

SENSING SOCKET ASSEMBLY

This invention relates to socket assemblies and their use in the supply of electrical power to multiple electrical devices.

There are a number of electronic "master" devices (e.g. computers, audio-visual and audio equipment) that are capable of being connected to, and used in conjunction with, one or more "peripheral" devices such as printers, scanners and monitors or hi-fi separates. Although each peripheral device is only ever used in conjunction with the master device, it is often the case that each peripheral device requires its own connection to a power supply.

As the prevalence in the home of suites of master and peripheral devices increases, so does the need for increased number of power supply outlets is (e.g. mains sockets). To a large extent, the current need has been met by "multi-way", trailing-lead socket banks. When plugged in to a domestic mains socket, these socket banks provide two or more (usually two to six) power outlets.

Although socket banks provide a solution to the problem of how to provide sufficient numbers of power supply outlets for suites of master and peripheral devices, they do not address a further problem arising from such suites. That is, because each peripheral device is often independently connected to a mains outlet, each such device may need to be turned off separately or isolated from the mains supply separately. Where a number of different peripheral devices are connected to a master device, the user of that master device may not remember and/or wish to expend the effort to turn off all of the peripheral devices at the same time as the master device. The upshot of this can be that peripheral devices are left in operation, or at least connected to the live mains supply, during periods when the master device is not in use. The consumption of electrical power by the peripheral devices during such periods can cause unnecessary expense for the user. Moreover, it can ultimately have a negative effect on the environment (e.g. by increasing the consumption of fossil fuels by power stations).

We have found that an assembly of electrical outlet sockets to which the supply of electrical power to the peripheral devices can be interrupted in response to a change in power consumption of a master device solves the above-mentioned problems.

According to a first aspect of the invention there is provided a power distribution apparatus comprising:
- a master electrical outlet and at least one slave electrical outlet, both connectable to a common power source;
- sensing means for sensing power drawn from the master electrical outlet;
- a controller operable to isolate the at least one slave electrical outlet from the power source when the sensing means detects a fall in power drawn from the master electrical outlet from a first, higher level to a second, lower level.

In this aspect of the invention, it is preferred that the second, lower level is non-zero. Further, the first and/or second levels (which may correspond to the level of power drawn by an electrical device that is connected to the master electrical outlet) are preferably variable.

It is particularly preferred that the sensing means is operative to detect the fall in power as a fractional change. In this embodiment, the sensing means is preferably operative to detect whether the power drawn from the master electrical outlet has fallen below a threshold. The sensing means may also be operable to adjust the level of the threshold, for example to a level that is a fraction (e.g. a half) of the first, higher level.

In a further embodiment of this first aspect of the invention, the controller is operable to connect the at least one slave electrical outlet to the power source when the sensing means detects a rise in power drawn from the master electrical outlet from a third, lower level to a fourth, higher level. It is preferred that the third, lower level is non-zero and/or that the third and/or fourth levels are variable.

The third level may be substantially equal to the second level, and the fourth level may also be substantially equal to the first level. Further, the sensing means may be operative to detect the rise in power as a fractional change.

According to second aspect of the invention there is provided a power distribution apparatus comprising:
- a master electrical outlet and at least one slave electrical outlet, wherein the master electrical outlet is electrically independent to the at least one slave electrical outlet;
- means for supplying electrical power to the master electrical outlet;
- a controller, the controller including:
  - means for sensing power consumption drawn from the master electrical outlet; and
  - an electrical switching means;
- wherein the controller is operable to supply or interrupt electrical power to the at least one slave electrical outlet, when the sensing means detects a prescribed change in power drawn from the master electrical outlet, the prescribed change relative to a sensing power threshold.

When used herein, the term "power distribution apparatus according to the invention" includes, where relevant, references to the power distribution apparatus according to the first, as well as the second aspect of the invention.

According to another aspect of the invention there is provided a method of controlling the distribution of electrical power, the method comprising:
- supplying electrical power to a master electrical outlet and to at least one slave electrical outlet, from a common power source;
- sensing power drawn from the master electrical outlet;
- isolating the at least one slave electrical outlet from the power source when a sensing means in a controller detects a fall in power drawn from the master electrical outlet from a first, higher level to a second, lower level.

According to a yet further aspect of the invention there is provided a method of electrical power distribution, the method comprising:
- supplying electrical power to an electrical outlet assembly, the assembly including a master electrical outlet and at least one slave electrical outlet;
- sensing a change in the electrical power consumption drawn from the master electrical outlet; and
- supplying, or interrupting, electrical power to the at least one slave electrical outlet when the sensing means detects a change in power consumption drawn from the master electrical outlet, the change relative to a sensing power threshold.

In the preferred arrangement a master device is electrically connected to the master electrical outlet and electrical power for the device is drawn from the outlet. The master electrical outlet is available to supply electrical power whenever the power distribution apparatus receives electrical power.

The power distribution apparatus of the invention may be adapted to supply electrical power derived from any suitable power source to the master electrical outlet and the at least one slave electrical outlet. Suitable power sources may include a battery, a generator or, most preferably, the mains.

Electrical power may be supplied to the power distribution apparatus by any suitable means, such as a plug, which plug is preferably connected to the apparatus via a lead (e.g. a flexible lead of the type typically used with trailing-lead socket banks). When electrical power is supplied to the apparatus in this way, each electrical outlet is supplied with electrical power by way of electrical connections from the lead. The electrical connections supplying the master electrical outlet being separate to the electrical connections supplying the at least one slave electrical outlet.

In the power distribution apparatus of the invention, the controller may be any suitable arrangement or device that is capable of supplying or interrupting electrical power to the at least one slave electrical outlet, while supplying continuous electrical power to the master electrical outlet.

The master device may be any electronic device that is capable of producing, or being adapted to produce, a change in power consumption that is detectable by the controller of the power distribution apparatus of the invention. As such, preferred master devices include those that are capable of producing, or being adapted to produce, a change in the level of power consumption as a consequence of a change in operating state of the device (e.g. turning on, turning off, entering a stand-by mode or exiting a stand-by mode).

Preferably, the master device is an electronic device that can communicate, and be used in conjunction, with one or more peripheral devices. As such, preferred master devices include computers and electronic audio-visual or audio equipment (e.g. televisions or, preferably, amplifiers).

When used herein, the term "peripheral devices" includes electronic devices that operate in conjunction with the master device (e.g. by sending to and/or receiving from the master device a signal and/or data) in order to perform a function. In a preferred embodiment of the invention, where one or more peripheral devices is in communication with a master device, at least one of the peripheral devices does not receive its power supply from the master device.

When the master device is an amplifier, peripheral devices that may be mentioned include speaker systems (e.g. subwoofer(s)) and one or more sources of audio information (e.g. one or more of radio tuner, turntable, cassette deck, DAT player, CD player, video cassette player, DVD player and television). When the master device is a computer, peripheral devices that may be mentioned include one or more of monitor, printer, scanner, speaker(s), modem and video camera. When the master device is a television, peripheral devices that may be mentioned include one or more of speaker(s), amplifier, DVD player, games console and video cassette player.

The operating states of the master device preferably correspond to distinct power consumption levels. The levels are characteristic of the power requirements of the master device. Any change in the operating state of the master device produces a corresponding change in the power consumption. In a preferred embodiment of the invention, the controller is operable to sense the level of, and changes in, the power consumption of the master device connected to the master electrical outlet.

In the preferred embodiment of the invention, the power consumption of the master device is quantified by measurement of a corresponding potential that arises within the controller from a flow of current drawn by the master device.

In this embodiment, it is the measurement of the potential, and changes thereto, which forms the basis of sensing the level of, and changes in, power consumption.

The power consumption drawn from the master electrical outlet may be determined by any suitable means known to those skilled in the art.

In a preferred embodiment the controller decides on the basis of a sensed change in the level of power drawn from the master electrical outlet whether a change in operating state of the master device has occurred. A change in operating state may indicate the master device is turning on or turning off, or is entering or exiting a stand-by mode.

The master device may be connected to one or more peripheral devices, which are connected to one or more slave outlets of the apparatus and consequently these too may require powering up or powering down in accordance with the change of state of the master device.

The controller is arranged to supply or interrupt electrical power to the at least one slave electrical outlet of the power distribution apparatus, in response to a change of state of the master device connected to the master electrical outlet.

In a particularly preferred embodiment of the invention, the controller determines the operating state of the master device by measuring the level of power drawn from the master electrical outlet and comparing it to a non-zero threshold level.

In this embodiment of the invention, on at least the first time the master device is supplied electrical power through being connected to a master electrical outlet of the power distribution apparatus according to the invention, the controller is adapted to supply electrical power to the at least one slave electrical outlet only when the level of power consumption of the master device is above a pre-set lower threshold. When the master device is a computer, this lower threshold is preferably about 10 W.

The controller may also be adapted to supply electrical power to the at least one slave electrical outlet when the level of power consumption of the master device is above a pre-set upper threshold. When the master device is a computer, this upper threshold is preferably about 60 W.

The pre-set lower threshold defines the minimum power level at which the master device may be assumed to be active (i.e. 'on'), whereas the pre-set upper threshold is a higher power level indicative of the typical active power consumption of the master device.

As the power level at which a master device is active will vary between different types and different makes of master device, it is preferred that the controller is adapted to adjust the lower threshold level (i.e. the threshold level that is determinative as to whether electrical power is supplied to the one or more slave electrical outlets) away from its initial pre-set value, in order to suit the power characteristics of any master device.

To this end, the controller may be adapted to sense the actual power consumption of the master device in its active state and accordingly adjust the lower threshold level away from its pre-set value. The upper pre-set threshold may also be adjusted in an analogous manner.

It is therefore preferred that the controller is adapted to:
(a) determine, after a set delay from the time when the master device is switched to its operating state, the level of power consumption of the master device in its operating state (preferably its "steady" operating state); and then, if this level exceeds the pre-set value of the (lower) threshold (b) adjust the lower threshold, away from its pre-set value, to be a pre-determined percentage of the level of power consumption of the master device in its operating state.

To adjust the lower threshold level, the controller may optionally be adapted adjust the above-mentioned upper threshold, away from its pre-set value, to substantially match the level determined for the power consumption of the master device in its operating state. In this preferred embodiment, the lower threshold level is then set as a pre-determined percentage of the upper threshold level.

The lower (and, if relevant, upper) and threshold as adjusted is then an 'operating', as opposed to a pre-set, threshold.

The set delay mentioned at (a) above allows inrush currents to dissipate, and, when the master device is a computer, is preferably from about 1 to about 2 seconds. However, this delay may also be shorter in certain circumstances (e.g. depending on the type of master device used). For example, it may also be less than 1 second (e.g. between about 3 milliseconds and 1 second).

When the master device is a computer, the pre-determined percentage (as mentioned above) is preferably from about 30% to about 70%, and is more preferably about 50%.

By adjusting the lower (and, if relevant, upper) threshold level in this way, the controller can adaptively calibrate to suit the power characteristics of the master device attached to the apparatus. However, in a preferred embodiment, the controller is adapted to return the lower threshold (and, if relevant, upper) level to its original pre-set value in response to a pre-determined event. This event may, for example, be:
(i) an interruption in the supply of power to the controller and/or the power distribution apparatus according to the invention;
(ii) disconnection of a master device from the master electrical outlet; and/or, most preferably
(iii) the fall to zero of the power drawn from the master electrical outlet.

In the embodiments described above in which the controller has a lower threshold (whether pre-set or operating), the controller will compare the actual power consumption by the master device to the lower threshold.

If, at any time, the power consumption is above that lower threshold, then the controller decides that the master device is active, and will act to supply electrical power to the at least one slave electrical outlet.

Conversely, if, at any time, the power consumption of the master device is below that lower threshold, then the controller will assume that the master device is in a stand-by, 'sleep' or 'off' mode, and will act to interrupt the supply of electrical power to the one or more slave electrical outlets (i.e. isolate those one or more outlets from the power source).

The at least one slave electrical outlet is connected to an electrical power supply by forming an electrical connection between the slave electrical outlet and the power supply connections. Preferably, the controller controls an electrical signal to a suitable electrical arrangement or device adapted for use in forming the electrical connection between the at least one slave outlet and the power supply.

The suitable electrical arrangement or device may be any capable of making or breaking an electrical connection via either physical means or an electrically controlled conducting medium. As such, preferred devices include a bi-directional gate controlled thyristor i.e. a triac and a relay of the solid state or, preferably, the electromechanical variety.

In a preferred embodiment of the invention, the arrangement for forming an electrical connection between the slave electrical outlet and the power supply is a combination of a triac and an electromechanical relay. The combination increases the longevity of the relay contacts, as the triac handles high inrush currents occurring at the moment of connection arising of the one or more peripherals to the electrical power supply.

In another embodiment of the invention, the preferred device for forming an electrical connection between the at least one slave electrical outlet and the power supply is a triac only.

In a preferred embodiment of the invention the change in power consumption of the master device is sensed by measurement of a potential across a load-bearing element. The load-bearing element being electrically connected to the master electrical outlet. Any changes in power consumption of the master device produces changes in the potential across the element and changes in the current through the element.

According to a particularly preferred embodiment of the invention, the socket assembly is a socket bank of the type having a trailing lead (e.g. a multi-way socket bank, such as a 2-, 3-, 4-, 5-, 6-, 8- or 12-way socket bank) and the controller is located within the body of the socket bank.

The socket bank is preferably provided with surge protection (i.e. protection against damage by transient high voltages arising from the electrical power supply). This may be achieved by using materials and methods known to those skilled in the art. If the socket bank is of the type further comprising "in" and "out" radio-frequency antenna and/or telephone sockets, it is preferred that the circuits connecting each "in" to each "out" socket are also provided with surge protection.

The socket bank may also be provided with a visual notification means operable to indicate supply of electrical power to the master electrical outlet and/or the at least one slave electrical outlet.

The power distribution apparatus of the invention may be used in conjunction with a wide variety of master devices. However, it may be most conveniently employed to provide electrical power to peripheral devices that are in communication with the master device.

By using the power distribution apparatus according to the invention to supply power to peripheral devices, the supply of power to those peripheral devices may be interrupted in response to a change in the power consumption of the master device (such as turning off that device).

Embodiments of the present invention will now be described in detail by way of example and with reference to the accompanying drawings in which.

Figure 1:
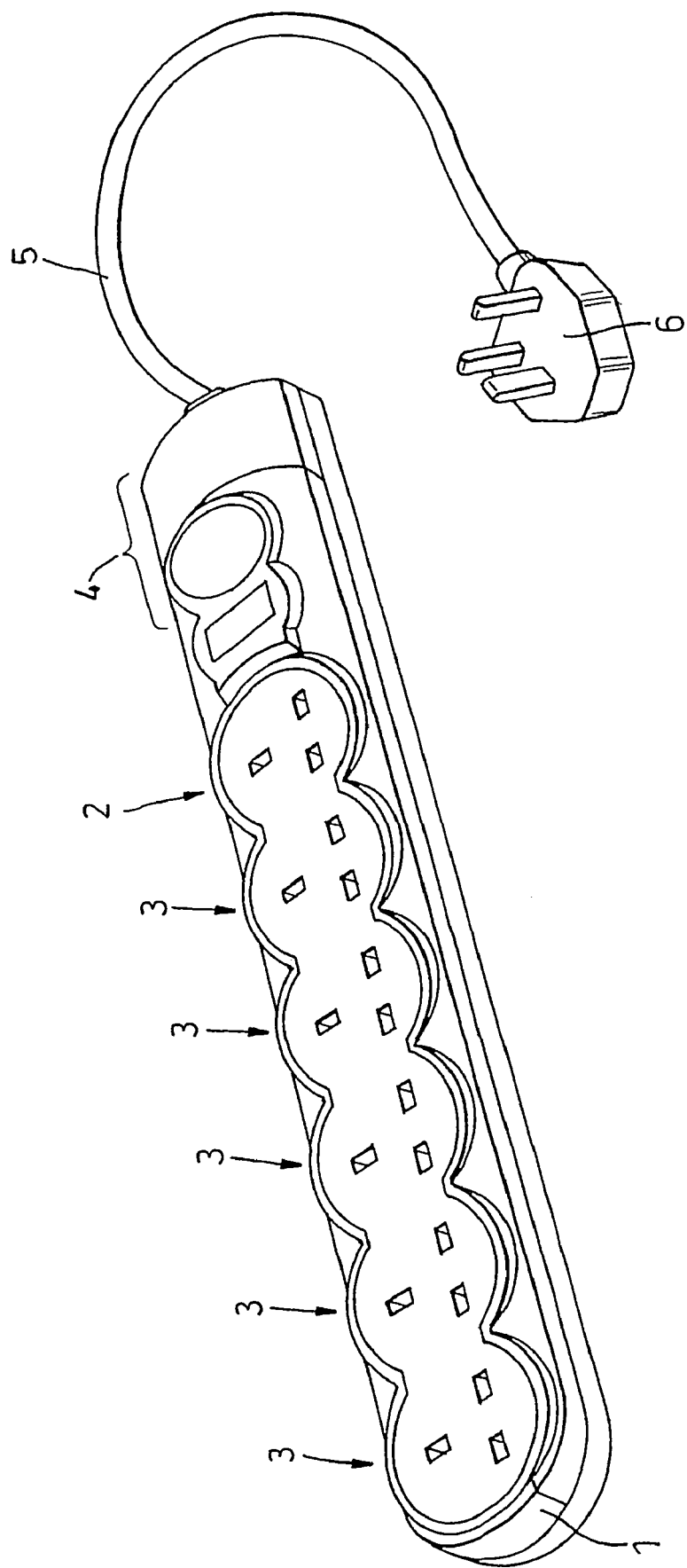
FIG. 1 is a schematic representation of the power distribution apparatus of the invention.

In FIG. 1 is shown a socket bank 1, which comprises a master electrical outlet 2 and one or more slave electrical outlets 3. An internal controller is located in the region designated 4. Plug 6 is of a type suitable for use with electrical mains sockets. Lead 5 provides an electrical connection between the controller and the plug 6.

Figure 2:
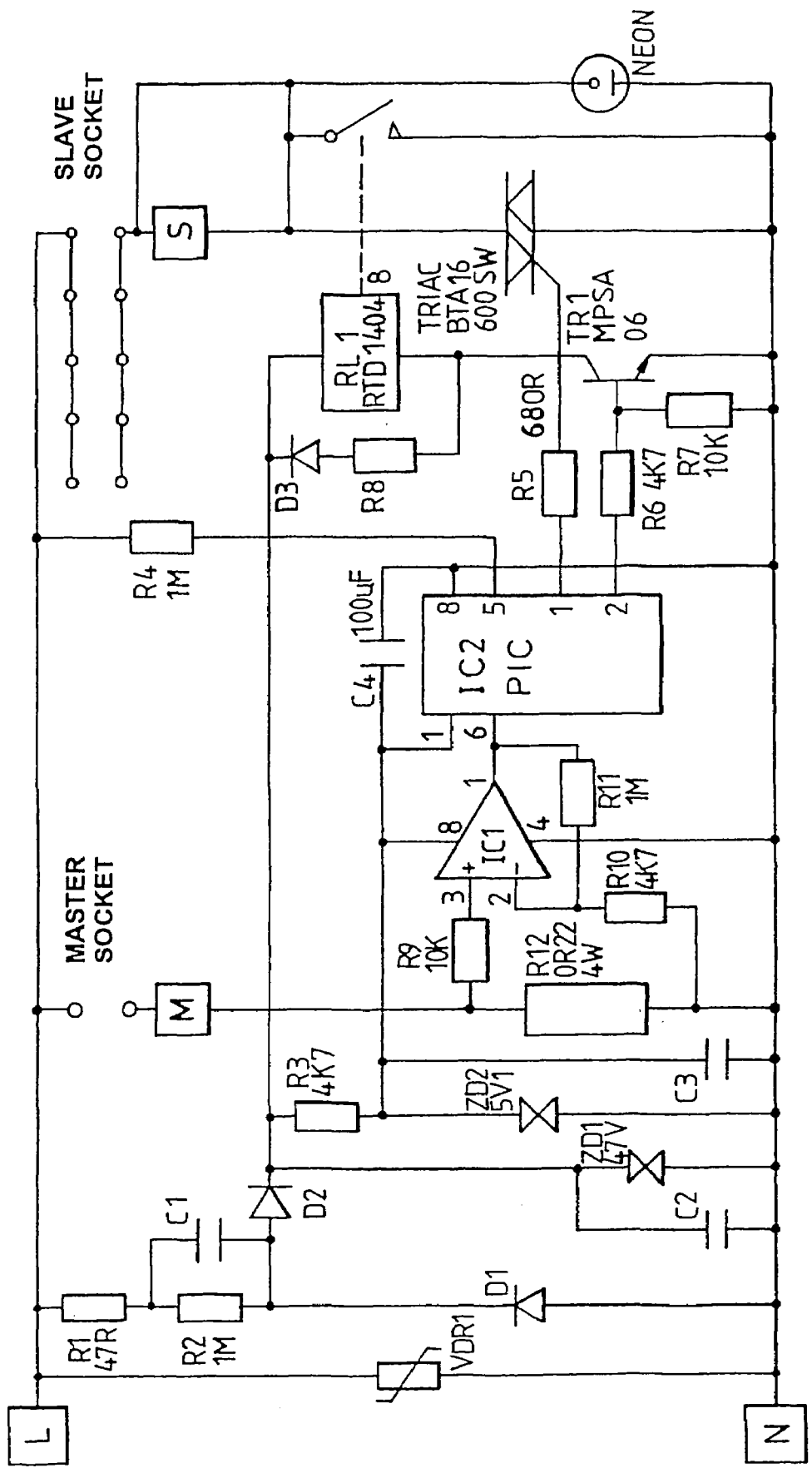
FIG. 2 is a circuit diagram of a controller for a socket assembly according to the invention, including a triac and an electromechanical relay.

With reference to FIG. 2, this is a particular implementation of a controller circuit for use in the power distribution apparatus of the invention. The controller is located within the body of an electrical outlet bank of the type having a trailing lead (e.g. a multi-way socket bank, such as a 2-, 3-, 4-, 5-, 6-, 8- or 12-way socket bank). Mains power is supplied between the terminals L & N, across which a varister VDR1 is connected. The varister is included to prevent any transient high voltages from the power supply damaging the power distribution apparatus, in particular the controller circuitry.

In FIG. 2, the arrangement of resistors R1 & R2, capacitor C1 and diodes D1 & D2 operate to provide a first stabilised DC power supply from the mains AC supply. The output from D2 is connected to neutral via zener diode ZD1 and capacitor C2, producing a 47 V DC supply between the output of D2 and neutral. This supply provides power to the coil of the electromechanical relay RL1.

The arrangement of the resistor R3, zener diode ZD2 and capacitor C3 produces a second stabilised power supply for the sensing means of the controller, which in the particular implementation comprise resistors R9, R12 and integrated circuits IC1.

Resistor R12 is a load-bearing element and is serially connected between the M terminal of the master electrical outlet and neutral N. The circuit in FIG. 2 is arranged so that the terminals of the master electrical outlet are permanently connected across the L & N mains terminals, to provide power to the master device whenever needed. The master electrical outlet is connected in FIG. 2 so as to be electrically independent to the at least one slave electrical outlet and separate to the switching devices.

When the master device consumes electrical power a current flows through the resistor R12 and generates a potential across it proportional to the current. The potential is sampled by resistor R9 and is applied to the non-inverting input 3 of the operational amplifier (op-amp) IC1. In FIG. 2 the op-amp is arranged to incorporate feedback via resistors R10 & R11. The op-amp amplifies the potential sampled by R9 using a gain given by the ratio of R10 and R11.

The use of an op-amp, incorporating feedback, to controllably amplify an input potential is well known to a person skilled in the art.

The amplified output potential from the op-amp is applied to the input 6 of PIC IC2. In order to allow any initial inrush currents to dissipate, the PIC is pre-programmed to wait typically for 1 to 2 seconds before assessing the input potential. The input potential indicates to the PIC an equated power consumption level of the master device connected to the master electrical outlet. The PIC then decides whether the lower pre-set power threshold has been exceeded. The PIC is pre-programmed with both an upper and a lower pre-set power threshold, the lower value corresponding to the minimum power consumption a master device must draw to be assumed active. If the PIC decides, on the basis of the pre-programmed thresholds, that the master device is active, outputs 1 and 2 are set high, and if not, the outputs remain low.

To ensure that the power distribution apparatus of the invention is capable of operating with a wide range of master devices, each with several operating states and associated power consumption levels, the controller is operable to sense when the power consumption drawn from the master electrical outlet changes by a prescribed amount and to distinguish between the power consumption levels of the master device. In the case of low power master devices, the difference in power between operating states may be small, whereas in high power devices the difference will be more pronounced.

To this end, in a preferred embodiment the PIC has been pre-programmed with two pre-set power thresholds, the thresholds defining power levels to which the power drawn from the master electrical outlet may be compared.

If the potential at PIC input 6 equates to a master device power consumption of 10 W or less, it is assumed the master device must be in a 'sleep' or 'stand-by mode' and outputs 1 and 2 will remain low.

If the potential at PIC input 6 equates to a master device power consumption of 60 W or more, it is assumed the master device must be 'on' and outputs 1 and 2 will become high.

If the potential at PIC input 6 equates to a master device power consumption above 10 W when the apparatus is first switched on, it is assumed the device is 'on' and outputs 1 and 2 will become high.

If the PIC decides that the master device connected to the master electrical outlet is active, it will adapt the upper pre-set threshold to substantially match the power consumption level drawn from the master electrical outlet. The program within the PIC will set the upper value to the master power level and thereafter use this value as an upper operating threshold.

The PIC calculates a power level equivalent to 50% of the upper operating threshold and adjusts the lower threshold to match this value, forming a lower operating threshold. In this way the program within the PIC automatically configures the PIC to suit the power consumption characteristics of the particular master device connected to the master electrical outlet.

If the master device power consumption falls by more than 50% of the upper operating threshold, taking it below the lower operating threshold, outputs 1 and 2 will become low. At this point, it is assumed by the PIC that the master device has entered a sleep or stand-by mode, or else has turned off.

Conversely, if, following a previous fall, the power consumption increases by more than 50% of the upper operating threshold, taking it above the lower operating threshold, the outputs 1 and 2 will become high. In this event, the PIC assumes that the master device has left a sleep or stand-by mode and has returned to an active state.

The upper and lower operating thresholds are maintained by the program within the PIC unless electrical power is interrupted to the power distribution apparatus. In this case, the PIC program causes the power thresholds to revert back to their pre-set values.

The PIC output 2 will only change between high and low states when the mains AC sinusoidal waveform crosses the zero volt level. This constrains the output state change to occur at specific intervals of the wave cycle and reduces any harmonic distortion of the mains supply.

If the PIC decides the outputs 1 and 2 should become high, in response to a change in operating state of the master device, a train of pulses at PIC output 1 will commence at the occurrence of the next zero volt level and will continue for the next half cycle.

Concurrently, the PIC output 2 will become high and remain in this state until the master device is deemed to have returned to a sleep or stand-by mode, or is turned off.

In the particular implementation of FIG. 2, a train of pulses originating at PIC output 1 will propagate to the triac and at the beginning of the pulse train the triac will conduct and connect the at least one slave electrical outlet across the mains supply.

A high state at PIC output 2 will cause the transistor TR1 to switch and the coil of relay RL1 will be energised at the same moment corresponding to the triac conducting. The relay contacts will close approximately 4 milliseconds later, this being the typical pull-in time of the relay. The closure of the contacts short-circuits the triac and no further heating of the triac occurs.

The one or more slave outlets (and hence any peripheral devices connected to them) are flow supplied with mains power and will continue being so until which point the master device changes operating state, so as to return to a sleep or stand-by mode, or turn off.

When the controller senses a fall in power consumption of the master device, indicating a change in operating state, a train of pulses once again occurs at PIC output 1 at the next zero volt level, lasting for a full half cycle. The pulse train powers the triac and the triac conducts. Concurrently, the output voltage at PIC output 2 becomes low and transistor TR1 turns off.

The relay coil no longer receives power and the magnetic energy is dissipated by coil current circulation through resistor R8 and diode D3. The relay contacts open when the circulating current falls below the relay hold-in current level. The drop-out time of the relay reduces as the value of resistor RS increases. The value of resistor R8 is constrained by the voltage rating of the transistor TR1.

The PIC output 1 will become low at the next zero volt level after the relay contacts have opened. The triac stops conducting and the at least one slave electrical outlet is disconnected from the mains supply.

Figure 3:
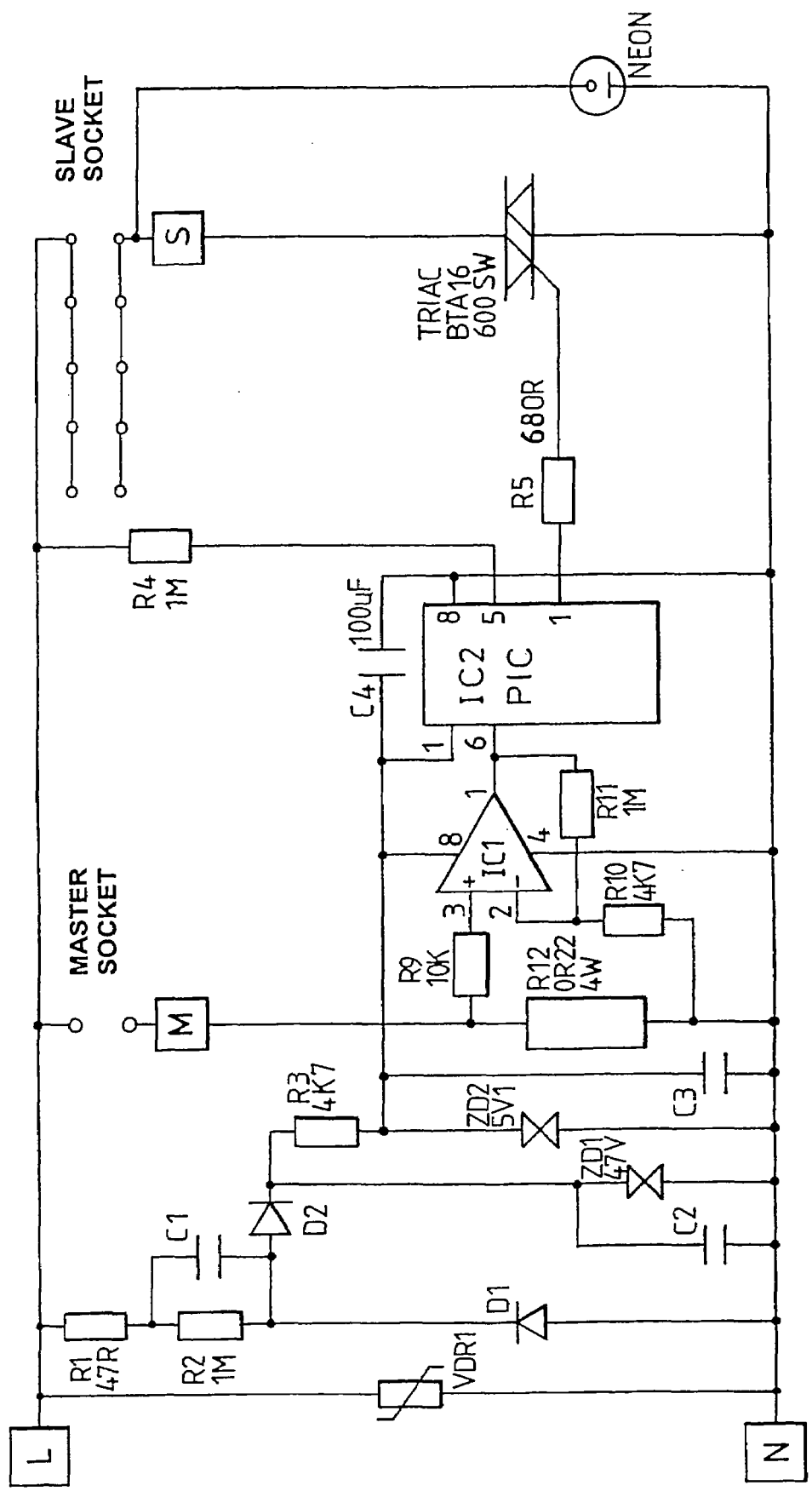
FIG. 3 is a circuit diagram of a controller for a socket assembly according to the invention, including a triac only.

In FIG. 3 is another implementation of a controller circuit for use in the power distribution apparatus of the invention. The operation of the circuit is substantially similar to the operation of the circuit as in FIG. 2. The arrangement for forming an electrical connection to connect the at least one slave electrical outlet to the electrical power supply consists of a triac only.

The power distribution apparatus of the invention has the advantage that, when used to supply power to one or more peripheral devices, the power supply to those devices may be interrupted both simply and conveniently by producing a change in the power consumption level of a master device.

When one or more peripheral devices, each being in communication with a single master device, are powered via the power distribution apparatus of the invention, this provides the further advantage that both time and electrical energy may be saved by allowing interruption of the power supply to the peripheral devices in response to a change in operating state of the master device (e.g. the switching off of the master device or its entry into a 'sleep' or 'stand-by' mode).

Moreover, in such situations, because the power distribution apparatus of the invention interrupts the power supply to the at least one slave electrical outlet, this provides the additional advantage that problems arising from the failure or malfunction of electrical circuits within the peripheral devices cannot pose a safety risk (e.g. an electrocution or fire risk) whilst the master device is not in operation. This is not the case when such peripheral devices are switched off using the switching means provided on the device alone (wherein electrical power is still supplied to the switching circuit of the peripheral device).

Other embodiments are taken to be within the scope of the accompanying claims.

The invention claimed is:

1. A power distribution apparatus comprising:
a master electrical outlet configured for coupling to a master device;
at least one slave electrical outlet, the master electrical outlet being electrically independent to the at least one slave electrical outlet; and
a power circuit to supply electrical power to the master electrical outlet and to the at least one slave electrical outlet comprising a sensing component operable to sense a master device power consumption level drawn from the master electrical outlet when the master device is coupled to the master electrical outlet, a switching component operable to selective supply electrical power or interrupt electrical power to the at least one slave electrical output in response to a switch command input, and a controller coupled to the sensing component and the switching component and being operable to generate the switch command input to supply or interrupt electrical power to the at least one slave electrical outlet by: (i) deriving an operating state power consumption level for the master device comprising the master device power consumption level sensed by the sensing component after a set time delay from when the master device is placed in an operating state, (ii) comparing the operating state power consumption level to an initial pre-set power threshold, (iii) if the operating state power consumption level exceeds the initial pre-set power threshold, adjusting the initial pre-set power threshold to an operating state power threshold comprising a predetermined percentage of the operating state power consumption level, and (iv) generating the switch command input in response to detection by the sensing component of a prescribed change in the master device power consumption level relative to the operating state power threshold.

2. A power distribution apparatus as claimed in claim 1, wherein the operating state threshold is non-zero.

3. A power distribution apparatus as claimed in claim 2, wherein the pre-determined percentage is from about 30% to about 70%.

4. A power distribution apparatus as claimed in claim 2, wherein the controller is adapted to return the operating state power threshold to the initial pre-set threshold in response to a pre-determined event.

5. A power distribution apparatus as claimed in claim 4, wherein the pre-determined event comprises at least one of:
(i) an interruption in the supply of electrical power to the power circuit; and/or
(ii) disconnection of a master device from the master electrical outlet; and/or
(iii) the fall to zero of the master device power consumption level.

6. A power distribution apparatus as claimed in claim 1, wherein the pre-determined percentage is from about 30% to about 70%.

7. A power distribution apparatus as claimed in claim 6, wherein the controller is adapted to return the operating state power threshold to the initial pre-set threshold in response to a pre-determined event.

8. A power distribution apparatus as claimed in claim 7, wherein the pre-determined event comprises at least one of:
(i) an interruption in the supply of electrical power to the power circuit; and/or
(ii) disconnection of a master device from the master electrical outlet; and/or
(iii) the fall to zero of the master device power consumption level.

9. A power distribution apparatus as claimed in claim 1, wherein the controller is adapted to return the operating state power threshold to the initial pre-set threshold in response to a pre-determined event.

10. A power distribution apparatus as claimed in claim 9, wherein the pre-determined event comprises at least one of:

(i) an interruption in the supply of electrical power to the power circuit; and/or (ii) disconnection of a master device from the master electrical outlet; and/or (iii) the fall to zero of the master device power consumption level.

11. A power distribution apparatus as claimed in claim 1, wherein the switching component is selectively operable in a first state in response to the switch command input providing electrical connectivity between the power circuit and the at least one slave electrical outlet.

12. A power distribution apparatus as claimed in claim 11, wherein the switching component is selectively operable in a second state in response to the switch command input to interrupt electrical connectivity between the power circuit and the at least one slave electrical outlet in response to a fall in the master device power consumption level below the operating state power threshold.

13. A power distribution apparatus as claimed in claim 11, wherein the switching component is operable in the first state in response to the switch command input in response to a rise in the master device power consumption level above the operating state power threshold.

14. A power distribution apparatus as claimed in claim 1, wherein the power circuit includes an electrical load-bearing element coupled to the master electrical outlet.

15. A power distribution apparatus as claimed in claim 14, wherein the sensing component is electrically connected across the load-bearing element, so as to measure electrical potential across the element.

16. A power distribution apparatus as claimed in claim 1, wherein the master electrical outlet and the at least one slave electrical outlet supply mains power.

17. A power distribution apparatus as claimed in claim 1, wherein the switching component comprises a bi-directional gate controlled thyristor.

18. A power distribution apparatus as claimed in claim 1, wherein the switching component comprises a relay.

19. A power distribution apparatus as claimed in claim 1, wherein the controller comprises electrical power rectification means capable of converting an alternating electrical power supply into an internal DC supply.

20. A power distribution apparatus as claimed in claim 1, further comprising a component to prevent the controller being damaged by transient high voltages in the power circuit.

21. A power distribution apparatus as claimed in claim 1, further comprising a component to visually indicate supply of electrical power to the master electrical outlet and/or the at least one slave electrical outlet.

22. A method comprising:
supplying electrical power to a master electrical outlet and at least one slave electrical outlet;
sensing an operating state power consumption level drawn from the master electrical outlet when a master device is coupled to the master electrical outlet and has been in an operating state for a predetermined period of time;
establishing an operating power threshold by determining whether the operating state power consumption level exceeds a pre-set initial value and, if so, establishing a predetermined percentage of the operating state power consumption level as an established operating state power threshold; and
supplying or interrupting electrical power to the at least one slave electrical outlet in response to comparison of subsequent changes in power consumption drawn from the master electrical outlet to the established operating state power threshold.

23. A method as claimed in claim 22, wherein the predetermined percentage is from about 30% to about 70%.

24. A method as claimed in claim 22
further including returning the established operating state power threshold to the operating state power threshold to the preset initial value in response to a pre-determined event.

25. A method as claimed in claim 24, wherein the predetermined event comprises at least one of:

(i) an interruption in supply of electrical power; and/or (ii) disconnection of a master device from the master electrical outlet; and/or (iii) the fall to zero of the master device power consumption level.

26. A method as claimed in claim 22
wherein the electrical power is interrupted to the at least one slave electrical outlet in response to a fall in power consumption drawn from the master electrical outlet below the established operating state power threshold.

27. A method as claimed in claim 26
wherein the electrical power is supplied to the at least one slave electrical outlet in response to a rise in power consumption drawn from the master electrical outlet above the established operating state power threshold.

28. A method as claimed in claim 22
wherein the electrical power is supplied to the at least one slave electrical outlet when power consumption drawn from the master electrical outlet is at or above the established operating state power threshold.

* * * * *

UNITED STATES PATENT AND TRADEMARK OFFICE
CERTIFICATE OF CORRECTION

| | | |
|---|---|---|
| PATENT NO. | : 7,193,335 B2 | Page 1 of 1 |
| APPLICATION NO. | : 10/497851 | |
| DATED | : March 20, 2007 | |
| INVENTOR(S) | : Norman Palmer et al. | |

It is certified that error appears in the above-identified patent and that said Letters Patent is hereby corrected as shown below:

In The Claims

Column 10, Line 9, Claim 1, delete "output" and insert -- outlet --

Signed and Sealed this
Twenty-sixth Day of April, 2016

Michelle K. Lee
*Director of the United States Patent and Trademark Office*